Patented Apr. 13, 1943

2,316,629

UNITED STATES PATENT OFFICE 2,316,629

PRINTING INK

Hilger Peter Schmitz, Munich, Germany; vested in the Alien Property Custodian

No Drawing. Application May 13, 1940, Serial 334,892. In Germany June 30, 1939

1 Claim. (Cl. 260—32)

This invention relates to the preparation of printing inks and more particularly to the preparation of printing inks especially adapted to intaglio and similar printing.

Among the printing inks, especially intaglio printing inks, which contain as the binders natural or artificial resins only those in which the resins are dissolved in organic solvents such as benzene, toluene, gasoline and the like, have been technically successful.

Attempts have been made to eliminate the use of such solvents which are injurious to health, inflammable and expensive, and to employ in their place aqueous emulsions of rosin, peptized shellac and similar binders. Prints obtained from these inks however, are deficient in rubbing and water fastness. Furthermore, these proposed emulsions which have so far been recommended for binders for printing inks are not sufficiently stable for they separate too easily. They also present the difficulty that they do not wipe off clean from the printing plates and therefore cause smearing.

It has now been found that these deficiencies can be overcome by using as binders aqueous emulsions of polymers of compounds which in the monomer stage contain only one vinyl group, such as for example esters, acetals and ethers of polyvinyl alcohols and the polymers of acrylic and methacrylic acids and more particularly their derivatives especially their esters. As emulsifying agents the polyvinyl alcohols and their water soluble partial derivatives, particularly their partial esters with a saponification number of from 110 to 140, are especially suitable.

Emulsions of this type exhibit extraordinarily good stability, and the printing inks prepared from these binders, and more particularly intaglio printing inks, give prints which exhibit outstanding fastness to rubbing and water. With these inks the printing plates can be wiped clean without smearing. Other advantages of these new printing inks reside in the fact that they can be used to produce prints of very light shade for the binders employed according to this invention; are completely water white and crystal clear and give prints which are completely fast to light.

Example 1 kilogram of a 50% aqueous emulsion of a polyvinyl acetate plasticized with tricresyl phosphate and containing 5% of a polyvinyl acetate which has been saponified to a saponification number of 120 as the emulsifying agent, is homogenized in a color mill, mixer or similar apparatus with 300 grams of a basic dyestuff, for example, nigrosine. The resulting printing ink is adjusted prior to use to any desired viscosity by diluting with water. The printing ink thus obtained exhibits the desirable properties outlined above and is useful as a printing ink for general purposes and particularly as an intaglio printing ink.

Printing inks of similar value may be obtained by replacing the polyvinyl acetate in the above formula with related compounds such as the methyl, ethyl or butyl esters of polyacrylic or polymethacrylic acids.

In view of the large variety of polymers of this type which may be employed it is possible to meet widely varying special requirements by the selection of printing inks to fit the particular case. Obviously the proportions indicated in the above example may be varied within wide limits depending upon the result desired. Other plasticizers may of course be used in place of the tricresylphosphate specifically mentioned.

Fillers such as aluminum hydroxide or pigments such as carbon black or water insoluble pigments of all kinds may be emulsified into these new printing compositions.

In addition to the polyvinyl compounds other artificial or natural resins can be emulsified into these printing inks when desired such as for instance, solutions of gum damar in toluene or ethyl acetate, or cumaron resins in benzene or emulsions of such resins. As long as the amount of the polyvinyl or polyacrylic compounds in the printing inks is not too small, whereby their influence would be over-balanced by such additions, the printing inks with such additions will still exhibit essentially the same desirable properties as mentioned above.

In especially quick drying inks are desired, water insoluble solvents such as ethyl acetate may be included in the emulsions. The addition of such solvents shortens the drying time considerably since they accelerate the water evaporation due to the formation of azeotropic mixtures. It is a surprising fact that the incorporation of such solvents does not cause coagulation of the emulsified particles but instead gives a still finer and more stable dispersion.

I claim:

A printing ink consisting essentially of 1000 parts of a 50% aqueous emulsion of polyvinyl acetate, of which about 5% has been saponified to a saponification number between 110 and 140, a small amount of plasticizer, and 300 parts of a basic dyestuff.

HILGER PETER SCHMITZ.